United States Patent [19]

Farmer et al.

[11] Patent Number: 4,545,961

[45] Date of Patent: Oct. 8, 1985

[54] MULTI-COMPARTMENT DISC REACTOR WITH IMPROVED GAS INLET MANIFOLD

[75] Inventors: Julian K. Farmer, Bath, S.C.; Charles W. Hawk, Jr., Cleveland, Tenn.

[73] Assignee: Olin Corporation, Cheshire, Conn.

[21] Appl. No.: 385,347

[22] Filed: Jun. 7, 1982

[51] Int. Cl.$^4$ .................. B01F 9/08; B01F 13/04; B01J 10/00

[52] U.S. Cl. ............................. 422/193; 261/92; 422/113; 422/224; 422/234; 422/236; 423/516

[58] Field of Search ............... 422/188, 190, 193, 194, 422/195, 224, 229, 234, 113, 236; 423/516; 261/92, 119 R; 137/561 A, 68 A

[56] References Cited

U.S. PATENT DOCUMENTS

| | | | |
|---|---|---|---|
| 1,987,903 | 1/1935 | Houdry | 422/188 X |
| 2,145,374 | 1/1939 | Salerni | 261/92 |
| 3,390,964 | 7/1968 | Wurbs | 422/228 |
| 3,799,196 | 3/1974 | Scheitlin et al. | 137/561 A |

FOREIGN PATENT DOCUMENTS 0865469  3/1971  Canada ......................... 137/68 A

*Primary Examiner*—Barry S. Richman
*Assistant Examiner*—Brion P. Heaney
*Attorney, Agent, or Firm*—Ralph D'Alessandro; Donald F. Clements; Thomas P. O'Day

[57] ABSTRACT

A rotating disc reactor for production of sodium hydrosulfite comprising a reactor main housing containing a plurality of elongated reaction chambers with at least partially arcuate interior periphery. Each reaction compartment contains a top gaseous layer, an intermediate buffer solution layer, and a bottom sodium amalgam layer. Positioned in each compartment is a rotatable shaft with a plurality of rotatable discs mounted thereon for reacting and mixing the three layers of reactants. The reactor includes means for distributing amalgam and means for distributing recirculated buffer solution into each reaction compartment. At least one of the side walls of the housing is connected to an end box having inlet and outlet means for circulating the amalgam and the sodium hydrosulfite product. The reactor further includes a sulfur dioxide inlet manifold having an arcuate interior which is offset from the reactor housing. The sulfur dioxide inlet means is sloped from the horizontal toward the housing to reduce the build up of solid contaminants within the manifold.

8 Claims, 5 Drawing Figures

MULTI-COMPARTMENT DISC REACTOR WITH IMPROVED GAS INLET MANIFOLD

The present invention relates generally to the apparatus used in the production of aqueous sodium hydrosulfite. More specifically, it relates to the inlet manifold used to feed sulfur dioxide into each reaction compartment within each reactor.

Aqueous sodium hydrosulfite has been commercially produced in rotating disc reactors for at least the last decade. Since these reactors have typically been constructed from polyvinyl chloride, a recurring problem has been the rupturing of the sulfur dioxide inlet manifolds due to solid contaminant build-up and resultant pressure surges within each sulfur dioxide inlet manifold. The contaminant build-up is solid and crust-like and can block the sulfur dioxide inlet tubes to each reaction compartment within the reactor. When this blockage occurs, the pressure within the inlet manifold will increase as the sulfur dioxide is continuously fed into it.

An additional problem has occurred because of the particular location of the sulfur dioxide inlet manifold and the configuration of the interior of the inlet manifold. The manifolds typically were flush with the surface of the sodium hydrosulfite reactor and generally rectangular in shape. This positioning made it very difficult to thoroughly clean out the contaminants and other solid material that typically builds up within each sulfur dioxide inlet manifold because of the lack of space between the manifold and the reactor. Additionally, where interior right angle corners exist within the manifold, a dead space is developed that promotes the accumulation of contaminants and other solid material which form a crust-like solid.

These problems are avoided in the design of the present invention by providing an improved sulfur dioxide inlet manifold design which is used to feed sulfur dioxide into each reaction compartment within the sodium hydrosulfite reactor.

SUMMARY OF THE INVENTION

It is an object of the present invention to provide an improved sulfur dioxide inlet manifold for a sodium hydrosulfite reactor.

It is another object of the present invention to provide design improvements in the sulfur dioxide inlet manifold for a sodium hydrosulfite reactor that are low in cost and simple to effect.

It is a feature of the present invention that contaminant and solid build up within the improved sulfur dioxide inlet manifold of a sodium hydrosulfite reactor are reduced.

It is another feature of the present invention that the design of the sulfur dioxide inlet manifold of a sodium hydrosulfite reactor is improved to facilitate the periodic cleanings of the manifold during scheduled maintenance service.

It is a further feature of the present invention that the sulfur dioxide inlet manifold is offset from the face or surface of the sodium hydrosulfite reactor to permit easier access.

It is an advantage of the present invention that the sulfur dioxide inlet manifold is easily cleaned out during scheduled maintenance operations.

It is another advantage of the present invention that dead space that promotes the build-up of contaminants and solid crust-like materials is reduced.

These and other objects, features, and advantages are obtained by providing in a rotating disc reactor for the production of aqueous sodium hydrosulfite an improved sulfur dioxide inlet manifold that is offset from the face of the reactor and substantially arcuate about its internal periphery to provide easier access for cleaning and less solid build-up within its interior.

BRIEF DESCRIPTION OF THE DRAWINGS

The advantages of this invention will become apparent upon consideration of the following detailed disclosure of the invention, especially when it is taken in conjunction with the following drawings wherein.

DETAILED DESCRIPTION OF THE PREFERRED EMBODIMENT

Figure 1:
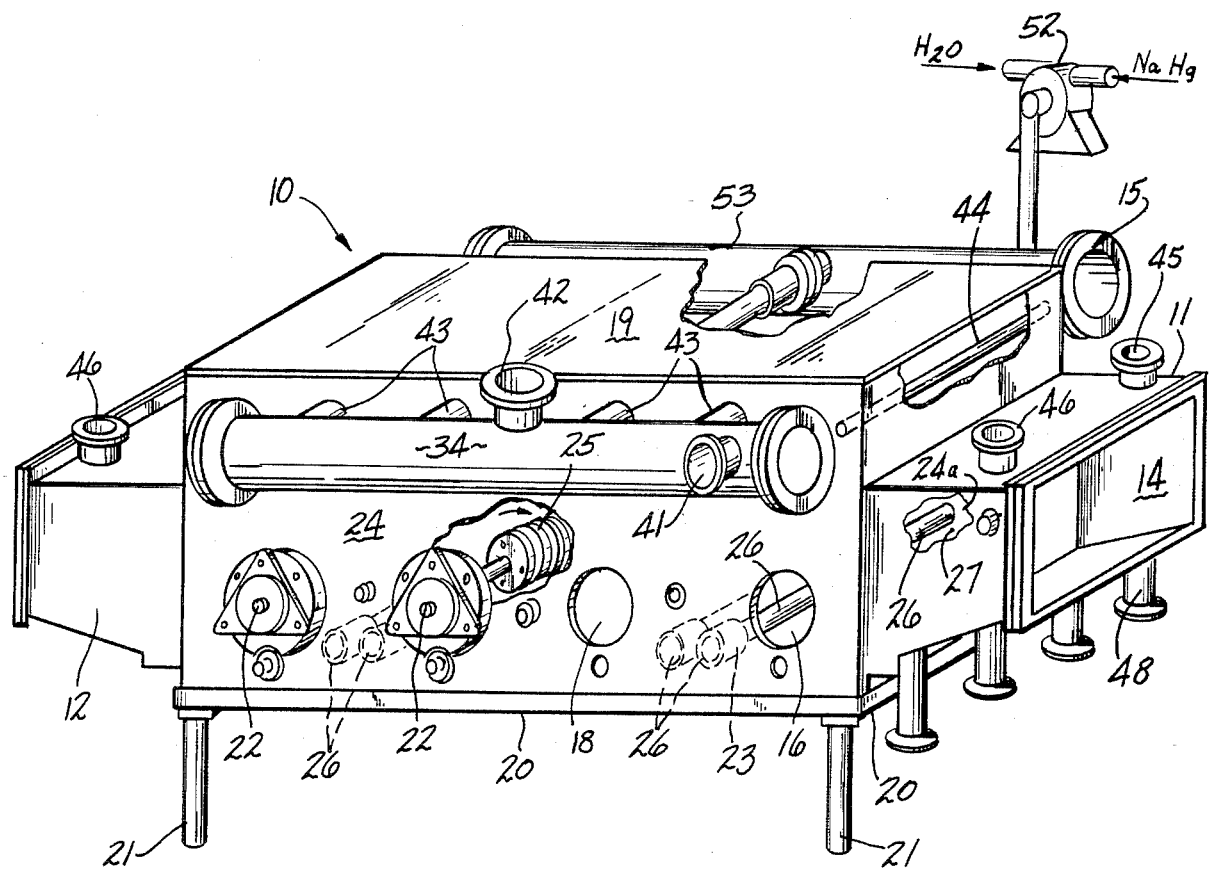
FIG. 1 is a front perspective view showing a sodium hydrosulfite reactor with the sulfur dioxide inlet manifold and with two of the four reaction compartments partially cut-away and their rotatable shafts removed.

Looking at FIG. 1, there is shown in partial front perspective view a reactor 10 that is a compartmentalized box constructed of polyvinyl chloride (PVC) and Plexiglass ®. Reactor 10 has two end reactor boxes 11 and 12 which serve, among other purposes, to degassify hydrogen and nitrogen gas entrained in the reactor solution. The end boxes 11 and 12 are covered with a transparent plate 14, preferably made of Plexiglass ®, to permit internal reactor operation to be observed for solution color, turbidity, and turbulence.

The reactor 10 has a main housing, indicated generally by the numeral 15, which includes four adjacently positioned reaction compartments, two of which, 16 and 18, are partially shown in FIG. 1. A reactor cover 19 fits atop reactor housing 15. The reactor 10 is seated atop a stand 20, made from angle iron or other appropriate material of suitable size and strength, to which are attached legs 21, only two of which are shown.

Figure 2:
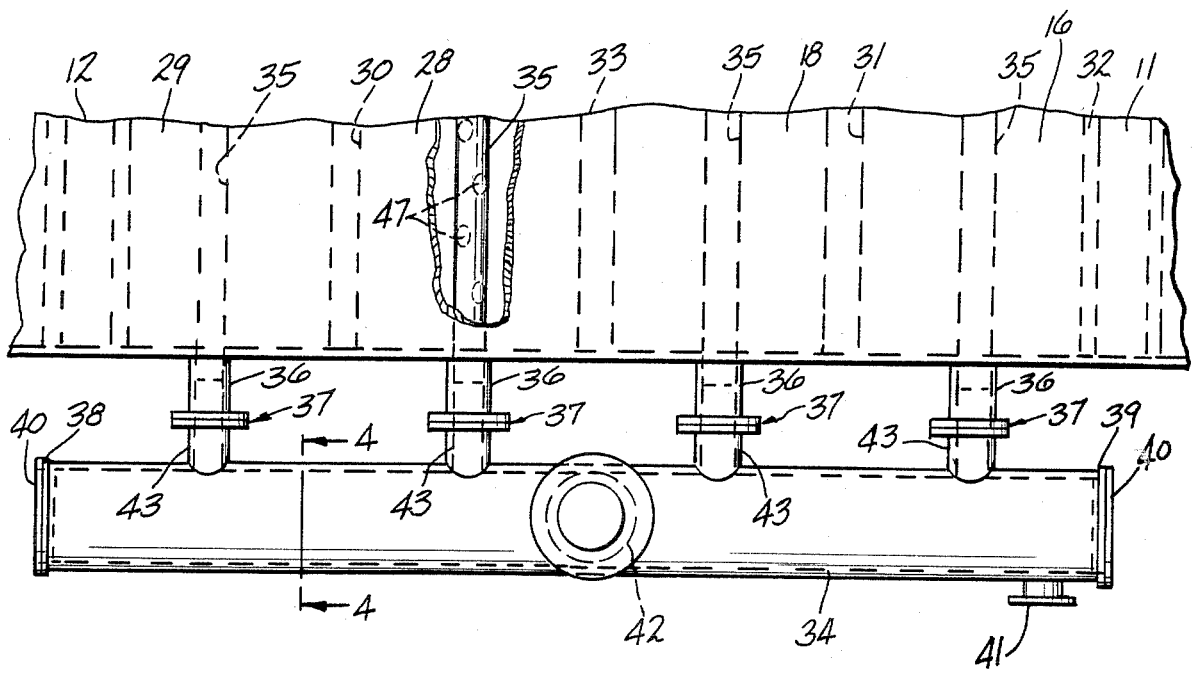
FIG. 2 is a top plan view of the sulfur dioxide inlet manifold and a portion of the sodium hydrosulfite reactor.
Figure 3:
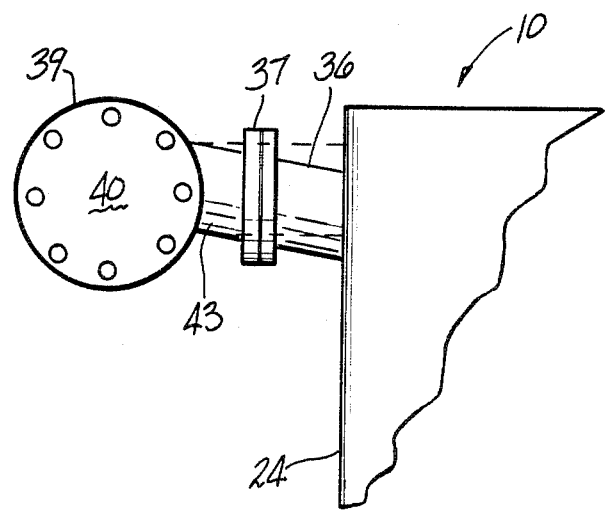
FIG. 3 is a side partial elevational view showing the inclination of the sulfur dioxide inlet manifold that is offset from the reactor.
Figure 4:
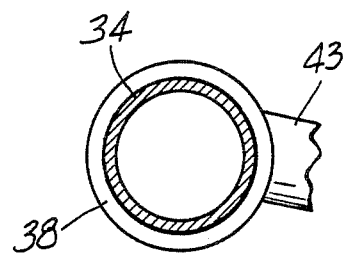
FIG. 4 is a sectional view along the lines 4—4 of FIG. 2 showing the arcuate interior of the sulfur dioxide inlet manifold.

As seen in FIGS. 1 and 2 the sulfur dioxide inlet manifold 34 is shown attached to the reactor 10 by inlet pipes 35. Each inlet pipe 35 leads into a individual reaction compartment only two of which, 16 and 18, are partially shown in FIG. 1. Each inlet pipe 35 fits within or is otherwise connected to sleeves 36 which are coupled by flanges 37 to the extension pipes 43 of the sulfur dioxide inlet manifold 34. Sleeves 36 and extension pipes 43 offset the inlet manifold 34 from the main body housing of the reactor 10 to facilitate the periodic cleanings that are necessary. Cleanout flanges 38, 39 are provided at each end of the inlet manifold 34 so that by removal of the end plates 40 the manifold may be hosed out with a stream of water and also be accessible for manual cleanings. The sulfur dioxide inlet manifold 34 is provided with an arcuate interior so that there are no right angle or sharp corners along its length to permit the buildup of contaminants that tend to form a crust-like solid during periods of operation. The offsetting of the inlet manifold 34, coupled with its arcuate interior, permits a thorough cleaning to be achieved at each regularly scheduled maintenance. This regular maintenance is performed approximately monthly.

The sulfur dioxide inlet manifold 34, with its extension pipes 43, is sloped or angled toward the reactor main housing 15 at approximately a 10° angle from the horizontal to permit the manifold 34 to prevent the buildup of materials, such as condensate and other contaminantes, in the extension pipes 43 and the manifold 34 that could clog or block the passageway to prevent the flow of sulfur dioxide into the individual reaction compartments. This downward or inward sloping or tilting of the inlet manifold 34 toward the reactor main housing 15 also permits the inlet manifold 34 to completely drain and promotes runoff of the rinse water and other liquids during the regular maintenance. A relief vent 41 may also be provided on the inlet manifold 34 and is generally placed adjacent the lower end. The relief vent is provided to permit a cap to blow off should the pressure within the inlet manifold 34 exceed a predetermined level.

As is best seen in FIG. 2, the sulfur dioxide inlet manifold 34 has an inlet supply pipe 42 that feeds centrally into the top of the inlet manifold 34 to provide the feed sulfur dioxide to the inlet manifold 34 and the reactor 10. The inlet supply pipe 42, as well as the inlet manifold 34, is made from polyvinylchloride (PVC) pipe. Similarly, the inlet pipes 35 which feed the gaseous sulfur dioxide into each reaction compartment are also made from PVC.

Figure 5:
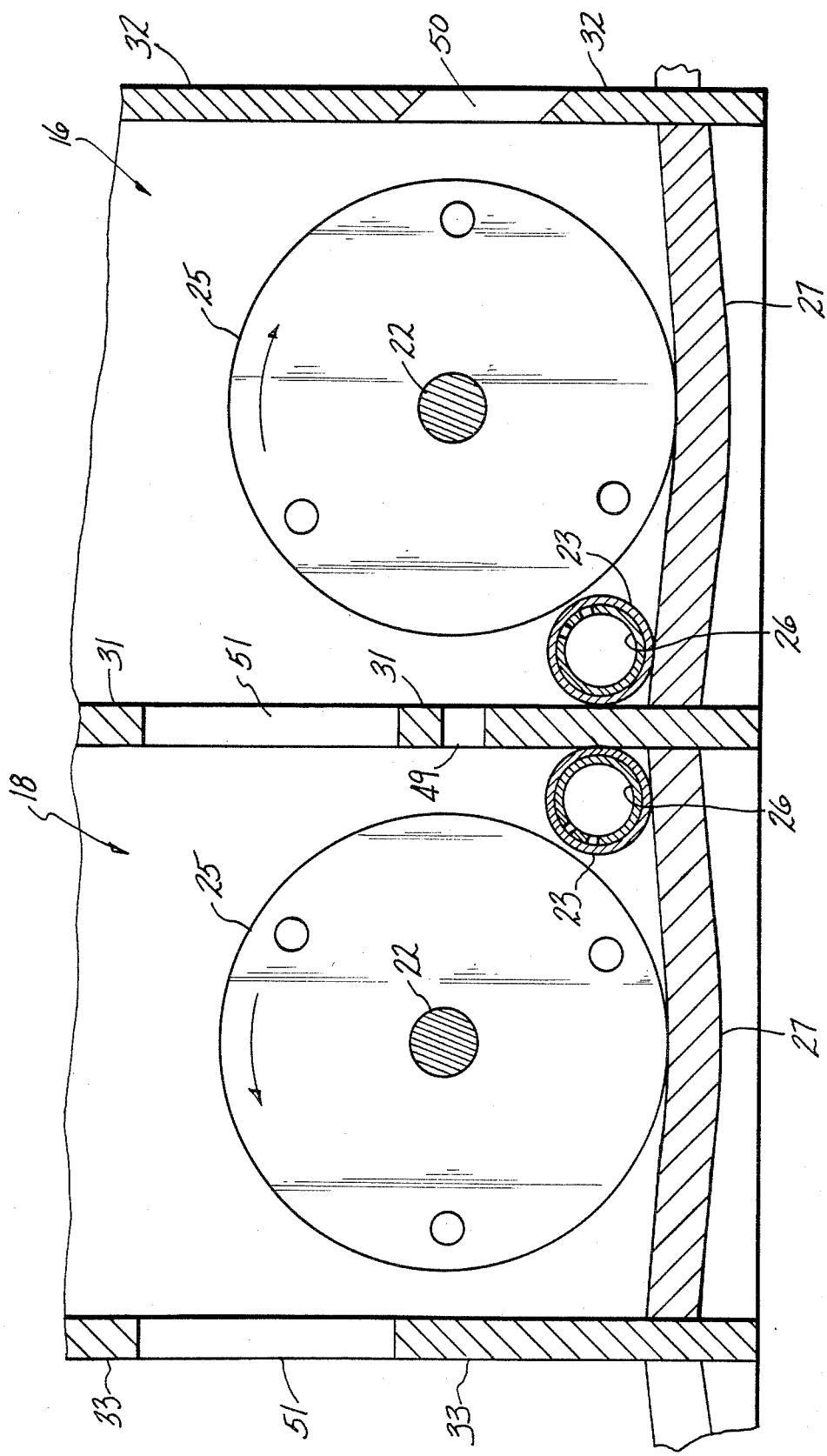
FIG. 5 is a side partial elevational view showing the partially arcuate interior of a reaction compartment having discs rotatably mounted about a shaft therein.

Each reaction compartment has a shaft 22 that extends therethrough and is mounted in the reactor end walls 24 and 24a, by appropriate unions and seals. Rotatably mounted about each shaft 22 are a plurality of discs 25, the collective peripheries of which circumscribe a predetermined path of travel (see briefly FIG. 5). Each reaction compartment has an inlet end adjacent the first reactor end wall 24a, through which the sodium amalgam (NaHg) is fed into each of the four reaction compartments. Either Moyno pumps or other types of positive displacement apparatus 52 may be employed to force the sodium amalgam through the amalgam distribution pipes 26. The sodium amalgam feed concentration is maintained at a predetermined sodium in mercury concentration level to achieve a balance that prevents overloading sections of the reactor 10 with sodium and prevents all of the sodium in the mercury from being reacted. This balance thereby maximizes the formation of sodium hydrosulfite while preventing the lack of sodium from causing powdered mercury by the action of the discs. The distribution pipes 26 are located adjacent the bottom curved surface 27 of each reaction compartment and have discharge holes (not shown) suitably arranged between appropriate hold-down clamps (also not shown) so that the discharge holes are aligned with the aforementioned discs on the rotors 22.

As best seen in FIG. 1, each amalgam distribution pipe 26 is inserted through openings in the reactor end wall 24 and into the coupling or sleeve 23. Coupling 23 may be made of PVC or other suitable material and is appropriately fastened to the opposing second end wall 24.

The action and structure of the discs on each shaft 22 in each reaction compartment have been described only generally, since they are well known in the art and are described in detail in U.S. Pat. No. 3,390,964, hereinafter specifically incorporated by reference in pertinent part. The overall process that occurs within the rotating disc reactor 10 to produce aqueous sodium hydrosulfite similarly is described in detail in this patent and will therefore be described only generally hereinafter. The reactants within each reaction compartment, such as compartments 16 and 18, are present in three layers of reactor material; a bottom layer of the aforementioned sodium amalgam, an intermediate layer of a buffer solution that includes sodium bisulfite ($NaHSO_3$) and sodium sulfite ($Na_2SO_3$), and a top layer of the sulfur dioxide ($SO_2$) gas. The rotation of the discs on each of the shafts 22 at a predetermined speed, normally approximately 50 revolutions per minute, through the three layers of material accomplishes the reacting and mixing of the various reactants. The rotation also agitates the buffer solution to provide for the exposing of fresh buffer solution surface to the sulfur dioxide gas layer immediately above it. The mixing or rotation accomplished by the discs also mixes the buffer solution for uniform concentration of the components and for uniform temperature distribution.

As partially seen in FIG. 2, two adjacent compartments 16 and 18 are separated by a central generally upright member 31. The adjacent compartments 16 and 18 have opposing generally upright side members 32 and 33, respectively, that define the opposing sides of the respective compartments. The central generally upright member 31 has communication holes 49 at the sodium amalgam phase level and a larger communication hole 51 at the buffer solution level. The generally upright opposing side member 33 which separates the two interior compartments in reactor 10 has no communication holes at the sodium amalgam phase level, but has communication holes 51 at the buffer solution phase level. Reaction compartments 28 and 29 are similarly arranged.

These communication holes at the buffer solution level in side member 33 permit the four reaction compartments in the reactor 10 to function as if there were two reactors present, instead of four separate compartments. The buffer solution communication holes 51 permit the sulfur dioxide gas and the buffer solution phases to intermix freely across all four compartments of the reactor 10. The opposing generally upright side member 33 separates the two innermost compartments 18 and 28 of the reactor 10 partially seen in FIG. 2, and has no communication holes at the amalgam phase level. This separates the reactor 10 into two reactors for the flow of the mercury amalgam. In contrast, the central generally upright members 30 and 31, separating the outermost compartments on each end of the reactor 10, for example compartments 16 and 18 and compartments 28 and 29, each have a sodium amalgam communication hole 49 that permits the sodium amalgam to freely flow from the pump-like action created by the rotation of the aforementioned discs. This pump-like action internally moves the sodium amalgam and denuded mercury through the reactor 10 outwardly from the generally upright side member 33 through the reaction compartments 18 and 16 and reaction compartments 28 and 29 to the opposing end boxes 11 and 12, respectively, via appropriate end box communication holes 50, only one of which is shown.

Make up water to replace that which is used in the reactor 10 during production is fed into the suction of the positive displacement amalgam feed pumps 52, only one of which is shown. This water enters the reactor through the amalgam distribution pipes 26. In addition to providing make up water, this water flushes the holes in the amalgam distribution pipes 26 to prevent blockage that may occur from amalgam crusts.

Sulfur dioxide distribution or inlet pipes 35 are found one in each compartment and provide the inlet into each reaction compartment for the sulfur dioxide through openings 47 in each pipe that may point downwardly or upwardly. Sulfur dioxide inlet pipes 35 and buffer or reactor solution recirculation pipes 44, only one in which is shown in FIG. 1, are located in the gas phase level of the reactor 10. The reactor solution is removed from the reactor end boxes 11 and 12 via the solution circulation outlet pipes 48, only one of which is shown in FIG. 1, and pumped at a predetermined flow rate through an appropriate heat exchanger to remove the heat of the reaction. This solution is then recirculated back into each reaction compartment and the reactor 10 through the individual solution recirculation inlet pipes 44 of FIG. 1. Outlet holes (not shown) in each one of the solution circulation inlet pipes 44 point downwardly so that the spray solution fans out through the sulfur dioxide gas providing a large surface area for reaction.

As previously mentioned, the end boxes 11 and 12 serve a multiplicity of purposes. One of the purposes is degassification to permit hydrogen and nitrogen to be released from its entrainment from within the central collection point through stand pipes 45 and 46 seen in FIG. 1.

In operation, sodium amalgam is pumped into the reactor 10 through the amalgam distribution pipes 26 that pass through the reactor end wall 24a. The buffer or reactor solution and the sulfur dioxide gas are brought into the reactor 10 through their inlet pipes 44 and 35, respectively, one in each reaction compartment. The sulfur dioxide gas is fed from the inlet supply pipe 42 to the sulfur dioxide inlet manifold 34 and then into the inlet pipes 35. The buffer or reactor solution is fed into its inlet pipes 44 through a similar manifold 53 of FIG. 1 on the opposite side of the reactor from the sulfur dioxide inlet manifold 34. The sodium amalgam is forced out of the distribution pipes 26 through holes therein so that the stream of sodium amalgam exits the distribution pipes 26 in line with the discs mounted on the shafts 22 whose peripheries circumscribe a predetermined path of travel during rotation. As the discs 25 rotate through the three layers of reactor material, the amalgam is picked up by the discs 25 and carried into the intermediate buffer or reactor solution layer. The heavier sodium amalgam is forced out of holes in the discs 25 and broken into small increments, thereby providing a large surface area and adequate mixing velocity to promote good reaction and mixing between the sodium and bisulfite ions present in the buffer solution layer. As the discs continue to turn, the buffer solution fills the discs as the sodium amalgam exits. The buffer solution is then carried into the gas phase level where the sulfur dioxide reacts with the sulfite ion. The discs 25 continue their rotation through their predetermined path back into the buffer solution layer where more solution is picked up and forced into the amalgam layer phase. At this point, the discs 25 move through the sodium amalgam, completing one complete revolution.

The rotation of the discs 25 in the predetermined directions serves to internally pump the sodium amalgam and spent or denuded amalgam from which the sodium has been stripped, moving it through the reactor compartments outwardly towards the end boxes 11 and 12. In the reactor end boxes 11 and 12 the sodium amalgam and denuded amalgam are split into two streams. One stream of denuded amalgam is recycled to the amalgam circulation pumps 52 through an amalgam mixer (not shown) to dilute the supply sodium amalgam typically provided from a mercury chlor-alkali cell. The other stream flows to a mercury sump (not shown) where it is pumped to the chlor-alkali cell to increase its sodium concentration level.

The agitation created by the rotation of the discs 25 also agitates the buffer or reactor solution to expose fresh buffer solution surface area to the sulfur dioxide gas above the solution, as well as mixing the buffer solution to accomplish more uniform concentration of the components and the temperature. As the sodium amalgam and the denuded amalgam moves from the interior of the reactor to the exterior into the end boxes 11 and 12, the sodium amalgam and denuded amalgam flow in the interior compartments. For example, in one half of the reactor the flow goes from reaction compartment 18 through the sodium amalgam communication hole in generally upright member 31 into the adjacent reaction compartment 16. The buffer solution communication holes between each adjacent reaction compartment, for example, the holes in generally upright member 31 between compartments 18 and 16, serve to permit the gas and buffer solution phases to freely intermix across all four reaction compartments in the reactor 10. However, since the generally upright member 33 separating the two most interior reaction compartments has no sodium amalgam communication hole, sodium amalgam flows centrally from the two innermost compartments outwardly toward the end boxes 11 and 12.

The aforedescribed flow of the sodium amalgam and the denuded amalgam is facilitated by the utilization of transition members (not shown) to cover the dead spaces (also not shown) that are present at each right angle junction in each reaction compartment. The close tolerance between the peripheries of the discs as they travel about their predetermined path of travel between the curved bottom surface 27, the transition member (not shown) and the amalgam distribution pipes 26 promote thorough mixing of the reactants in each reaction compartment.

When it is necessary to perform routine scheduled maintenance for the reactor 10, such as on a monthly basis, the sulfur dioxide inlet manifold 34 with its clean out flanges 38 and 39 on opposing ends, is easily serviced. The end plates 40 are removed from each of the clean out flanges 38 and 39 to open the inlet manifold 34 on both ends. A water hose is then utilized to rinse out any solid materials, contaminants, and other residue that may have accumulated within the manifold during the operating period. The approximate 10° downward slope of the inlet manifold 34 towards the reactor main housing 15 provides natural drainage for the flushing or rinsing water. If all of the residue is not removed from the inlet manifold 34 by the flushing, a brush or other object may be inserted within the manifold in use to scrape or otherwise force out the desired material. When the servicing is complete, the end plates 40 are reattached, such as by a plurality of nuts and bolts, to the clean out flanges 38 and 39 and the sulfur dioxide inlet manifold 34 is then ready for use again.

It should be noted that the materials cited herein for the construction of certain components is only representative, and other equally effective alternative materials could be employed. For example, the amalgam distribution pipes 26 could be fabricated from a suitable thermoplastic material, such as Kynar ® plastic. Similarly, the reactor housing may be constructed of fiber reinforced plastic or other suitable materials, such as polystyrene foam plastic or metal, such as iron that is coated with a protective plastic. Shafts 22 may be made of a metal covered with rubber or a suitable plastic such as polyvinyl chloride or polystyrene.

While the preferred structure in which the principles of the present invention have been incorporated is shown and described above, it is to be understood that the invention is not to be limited to the particular details thus presented, but in fact, widely different means may be employed in the practice of the broader aspects of this invention. The scope of the appended claims is intended to encompass all obvious changes in the details, materials, and arrangement of parts which will occur to one of skill in the art upon a reading of this disclosure.

Having thus described the invention, what is claimed is:

1. A rotating disc reactor for the production of sodium hydrosulfite in water comprising in combination:
   (a) a reactor main housing having opposing end walls connected by opposing side walls, a top and a bottom;
   (b) a plurality of elongate reaction compartments each of said compartments having a predetermined length with at least a partially arcuate interior periphery each compartment further having a top layer of a gas phase, an intermediate layer of a buffer solution and a bottom layer of sodium amalgam;
   (c) a rotatable shaft with each reaction compartment about which are mounted a plurality of rotatable discs, each shaft being rotatably mounted to the opposing end walls and extending the predetermined length of its respective reaction compartment;
   (d) means for distributing sodium amalgam into each of the reaction compartments in the bottom layer of sodium amalgam therein;
   (e) means in each of the reaction compartments for the distributing recirculated buffer solution back into the top layer of the gas phase therein;
   (f) at least one end box mounted to one of the opposing side walls having a plurality of inlet and outlet flow means connected thereto for sodium amalgam and product sodium hydrosulfite circulation;
   (g) water supply means for supplying make up water connected to the means for distributing sodium amalgam; and
   (h) sulfur dioxide inlet means sloped from the horizontal a predetermined amount towards the main housing, connected to each of the reaction compartments and having an arcuate interior through which sulfur dioxide passes, the sulfur dioxide inlet means further being offset from the reactor main housing a predetermined distance so that the sulfur dioxide enters the reaction compartments into the gas phase top layer and passes into the buffer solution intermediate layer by the action of the rotatable discs as they rotate about the rotatable shaft in each reaction compartment to mix the sodium amalgam, buffer solution and sulfur dioxide.

2. The apparatus according to claim 1 wherein the sulfur dioxide inlet means has a first end and an opposing second end, each end further having removable end plates thereover.

3. The apparatus according to claim 1 wherein the sulfur dioxide inlet means further has a relief vent therein.

4. The apparatus according to claim 1 wherein the plurality of inlet pipes further have a plurality of openings that point generally downwardly to release the sulfur dioxide into each reaction compartment.

5. The apparatus according to claim 1 wherein a plurality of inlet pipes of predetermined size connect the reaction compartments to the sulfur dioxide inlet means.

6. The apparatus according to claim 5 wherein the plurality of inlet pipes further are connected to a plurality of sleeves.

7. The apparatus according to claim 6 wherein the plurality of sleeves are further connected to the sulfur dioxide inlet means via a plurality of detachable couplings.

8. The apparatus according to claim 7 wherein the sulfur dioxide inlet means is connected to the plurality of detachable couplings via a plurality of extension pipes.

* * * * *